United States Patent [19]
Winkler et al.

[11] 3,939,484
[45] Feb. 17, 1976

[54] SHUTTER COCKING AND RELEASE MEANS FOR PHOTOGRAPHIC APPARATUS WITH EXPANSIBLE HOUSING

[75] Inventors: Alfred Winkler, Munich; Dieter Engelsmann, Unterhaching; Dieter Maas, Munich; Rolf Schröder, Baldham, all of Germany

[73] Assignee: AGFA-Gevaert, AG, Leverkusen, Germany

[22] Filed: Sept. 23, 1974

[21] Appl. No.: 507,833

[30] Foreign Application Priority Data
Sept. 22, 1973 Germany.................. 7334432[U]

[52] U.S. Cl. ............ 354/187; 354/204; 354/208; 354/268
[51] Int. Cl.² .................. G03B 17/04; G03B 17/38
[58] Field of Search............ 354/187, 268, 266–267, 354/207–208, 60, 287–288, 212–213, 216, 204

[56] References Cited
UNITED STATES PATENTS

| | | | |
|---|---|---|---|
| 3,437,026 | 4/1969 | Espig................................. | 354/267 |
| 3,440,939 | 4/1969 | Peterson et al..................... | 354/187 |
| 3,643,567 | 2/1972 | Douglas............................. | 354/187 |

Primary Examiner—L. T. Hix
Assistant Examiner—James LaBarre
Attorney, Agent, or Firm—Michael J. Striker

[57] ABSTRACT

A still camera wherein the main section of the housing contains a shutter, a pivotable shutter cocking member, a normally open switch which must be closed to terminate an exposure, and a release for opening the shutter and for closing the switch. A second section of the housing is reciprocable with respect to the main section between an extended position in which the camera is ready to make an exposure and a depressed position in which the second section conceals the picture taking lens and the view finder in the main section. When the second section is moved to its depressed position, it directly or indirectly prevents the movement of release from a starting position and/or from closing of the switch. The shutter is cocked and the film is transported by the length of a frame in response to movement of the second section to its depressed position. A first spring biases the second section to its extended position and a second spring tends to close the switch but is prevented from establishing an electrical connection between two fixed contacts of the switch as long as the second section remains in the depressed position.

10 Claims, 4 Drawing Figures

3,939,484

SHUTTER COCKING AND RELEASE MEANS FOR PHOTOGRAPHIC APPARATUS WITH EXPANSIBLE HOUSING

BACKGROUND OF THE INVENTION

The present invention relates to photographic apparatus in general, especially to still cameras, and more particularly to improvements in photographic apparatus of the type wherein a section of the housing is movable with respect to the main section or vice versa to thereby cock the shutter and/or to transport the film by the length of a frame.

U.S. Pat. No. 3,864,705 of Winkler discloses a still camera wherein a housing section or cover member is reciprocable with respect to a main section to thereby cock the shutter and/or to transport the film by the length of a frame. The arrangement is such that, after each exposure, the cover member must be depressed to reduce the overall size of the housing and is thereupon released to the action of a spring to reassume an extended position whereby the camera is ready to make a further exposure. The film can be transported and the shutter can be cocked while the cover member moves to its depressed or extended position. When moved to its depressed position, the cover member preferably overlies the picture taking lens and/or the front and/or rear optical element of the view finder. The camera further comprises a locking device which can be actuated to hold the cover member in the depressed position so that the cover member cannot be returned to its extended position while the camera is stored in a small carrying case, in a pocket or in a purse.

SUMMARY OF THE INVENTION

An object of the invention is to provide an improved photographic apparatus of the type wherein the housing must be allowed or caused to expand prior to the making of an exposure, and more particularly to provide such photographic apparatus with novel and improved means for preventing the operation of release means and/or shutter when the apparatus is not ready to make an exposure, for example, because the size of its housing has been reduced so that the picture taking lens and/or the view finder is concealed.

Another object of the invention is to provide the above outlined photographic apparatus with novel and improved means for cocking the shutter simultaneously or substantially with the transport of photographic film by the length of a frame.

A further object of the invention is to provide the photographic apparatus with novel and improved means for preventing the making of double exposure and with novel and improved means for cocking a shutter of the type which is closed in response to a signal furnished by an electric circuit.

An additional object of the invention is to provide a photographic apparatus of the type wherein the closing of shutter takes place in response to actuation of a switch by the camera release and to provide such apparatus with novel and improved means for preventing the actuation of switch when the camera is not in an optimum condition for the making of exposures.

The invention is embodied in a photographic apparatus, especially in a miniature still camera, which comprises a housing having a first or main section and a second section or cover member movable between a first or depressed and a second or extended position, release means mounted in the first section and being movable from a starting position to an operative position to thereby open a shutter in the first section, a normally open shutteractuating switch (this switch can close the shutter in response to its closing by the release means to thereby terminate an exposure) mounted in the first section, means (e.g., a plate-like holder which is pivotably mounted in the first section) for closing the switch in immediate or delayed response to movement of release means to the operative position in the second position of the second housing section, and blocking means which is responsive to movement of the second section to prevent the closing of switch by the release means in the first position of the second section and to preferably prevent a movement of the release means from the starting position except when the second housing section assumes its second position.

The switch may comprise a first contact, a second contact which is spaced apart from the first contact, and a third contact which permanently engages the first contact and engages the second contact to thereby close the switch in response to movement of the closing means from a first to a second position. The blocking means comprises a member (e.g., a link) which maintains the closing means in the first position as long as the second housing section remains in its first position.

Alternatively, the switch may comprise a plurality of contacts which are conductively connected to each other when the switch is closed, and the blocking means may comprise a device (e.g., an integral portion of the second housing section) for moving one of the contacts to a position in which the one contact cannot be engaged by the other contact or contacts in response to movement of the release means to its operative position as long as the second housing section dwells in the first or depressed position. The second housing section causes or allows the one contact to move to a different position in which the one contact can be electrically connected with the other contact or contacts in response to movement of the release means to its operative position provided that the second housing section is caused or allowed to assume its second or extended position.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 4:
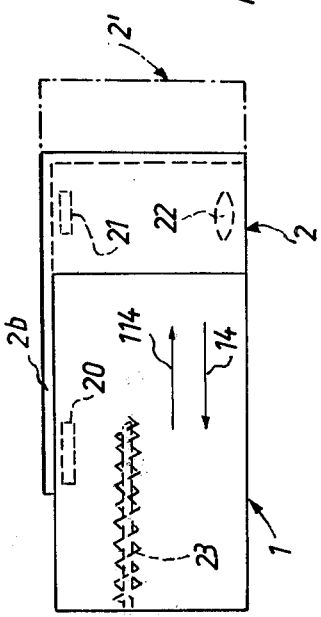
FIG. 4 is a smaller-scale schematic plan view of the photographic apparatus, the extended position of the movable housing section being indicated by phantom lines.

Referring first to FIG. 4, there are shown certain parts of a still camera which is similar to that disclosed in the commonly owned copending application Ser. No. 344,366. The camera comprises a housing or body including a first or main section 1 containing a picture taking lens 20, the front and rear optical elements 21, 22 of a view finder, a chamber (not shown) for a cassette containing a supply of photographic film, a door (not shown) which affords access to the chamber, a shutter of the type shown in FIGS. 1 to 3, a camera release of the type shown in FIGS. 1–3, a film transporting mechanism (not shown) and a cocking device for the shutter. The housing or body of the still camera further comprises a reciprocable second section or cover member 2 movable between a first or depressed position (shown by solid lines) in which a portion 2b thereof overlies the lens 20 and the front element 21 of the view finder, and a second or extended position 2' (indicated by phantom lines) in which the picture taking lens 20 is not concealed and an opening (not shown) in the front portion 2b registers with the optical element 21. The camera is ready for the making of an exposure when the section 2 assumes the extended position 2'. During movement from the position 2' to the depressed position which is shown by solid lines, the section 2 advances in the direction indicated by arrow 14 to thereby cock the shutter and to simultaneously actuate the film transporting mechanism so that the film in a cassette which is properly mounted in the aforementioned chamber is advanced by the length of a frame and the foremost unexposed film frame is located behind the lens 20. The camera further comprises a locking device of the type disclosed in the copending application Ser. No. 344,366 which can be operated to lock the section 2 in the solidline position of FIG. 4 whereby the size of the housing is reduced to a minimum so that the camera can be stored in a pocket, in a purse or in a miniature carrying case and the front portion 2b of the section 2 conceals and protects the picture taking lens 20 and a view finder. When the locking device is deactivated, the section 2 is automatically moved to the extended position 2' (see the arrow 114) under the action of a spring 23 which reacts against the section 1 and bears against a portion of the section 2.

Figure 1:
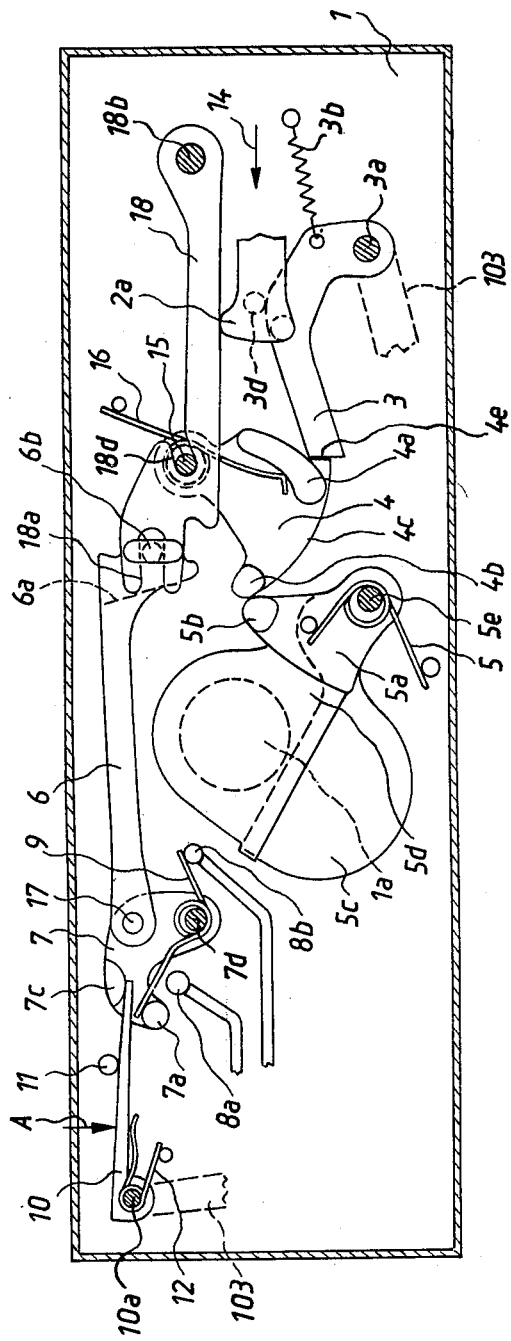
FIG. 1 is a schematic fragmentary vertical section through the main section of the housing of a photographic apparatus which embodies the invention, the shutter being shown in cocked position and the apparatus being ready for the making of an exposure.

FIG. 1 shows the shutter and the release means of the camera which embodies the structure of FIG. 4. The section 2 (not shown in its entirety) is assumed to be in the extended position 2' whereby a portion 22 of this section dwells in the position of FIG. 1. The light-admitting opening 1a for the lens 20 is overlapped by a first blade 5d of the shutter, i.e., the shutter is cocked. The section 2 is assumed to have been moved in the direction indicated by arrow 14 and thereupon released so that the spring 23 of FIG. 4 was free to expand and to return the section 2 to the extended position 2'. The blade 5d is rigid or integral with a carrier 5a which is pivotable on a pin 5e of the section 1 and is biased clockwise, as viewed in FIG. 1, by a torsion spring 5. The blade 5d cannot move to the open position of FIG. 2 because a follower or projection 5b of the carrier 5a is engaged and held by a projection or lobe 4b of a cocking member 4 which is pivotable in the housing section 1, as at 15, and is held in the angular position of FIG. 1 by a lever 3 operatively connected with the camera release 10 by a link train 103. The lever 3 is pivotable on a pin 3a of the housing section 1 and is biased clockwise by a helical spring 3b so that it normally assumes the position of FIG. 1. The cocking member 4 is biased counterclockwise, as viewed in FIG. 1, by a torsion spring 16 one leg of which bears against a retainer 4a.

The camera release 10 is a lever which is pivotably mounted on a pin 10a of the housing section 1 and is biased against a stop 11 by a torsion spring 12. The direction in which the release 10 must be pivoted by the user from the starting position of FIG. 1 to the operative position of FIG. 2 in order to make an exposure (when the shutter is cocked) is indicated by an arrow A. When the release 10 is pivoted away from the stop 11, the link train 103 pivots the lever 3 counterclockwise (see FIG. 2) whereby the cocking member 4 pivots counterclockwise under the action of the spring 16 and the spring 5 is free to propel the front blade 5d to the open position of FIG. 2 in which the foremost unexposed film frame receives scene light through the opening 1a. The illustrated release is but one of many means which can be used in the camera to release the blade 5d to the action of the spring 5 at the will of the user.

The cocking member 4 further comprises a convex cam face 4c whose center of curvature is located on the axis of the pivot pin 15.

Figure 2:
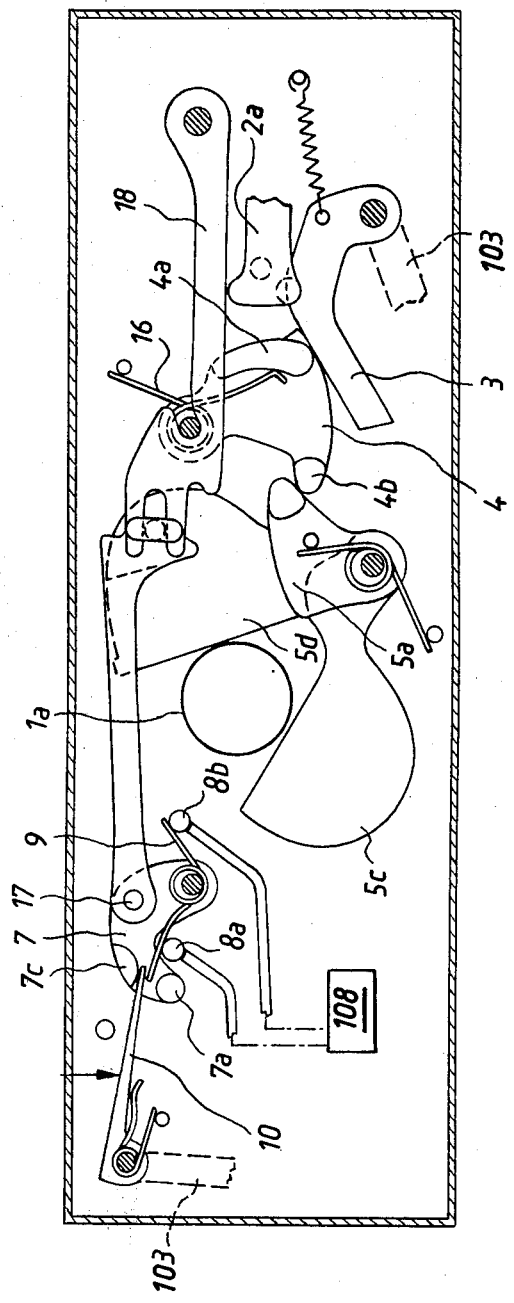
FIG. 2 is a similar view but showing the shutter in the open position.

The shutter further comprises a second or trailing blade 5c which is pivoted clockwise to overlie the opening 1a with a preselected or predetermined delay following the movement of front blade 5d to the open position of FIG. 2 to thereby determine the exposure time. It is assumed that the camera embodies a conventional electronic exposure control system including a circuit 108 shown in FIG. 2 which causes the trailing blade 5c to pivot clockwise with a delay which is a function of scene brightness. The circuit 108 allows or causes the blade 5c to pivot clockwise in response to closing of a normally open switch which includes two stationary contacts 8a, 8b and a movable contact 9 here shown as a torsion spring one leg of which is in permanent engagement with the contact 8b. The other leg of the spring 9 abuts against a projection or stop 7a on a switch closing member or holder 7 which is pivotable on a pin 7d of the housing section 1 and is articulately connected with one end of a blocking link 6 by means of a pin 17. The holder 7 further comprises a second projection 7c which defines with the projection 7a a space for the free end of the release 10. When the release 10 is pivoted clockwise (arrow A), the movable contact or spring 9 can pivot the holder 7 counterclockwise, as viewed in FIG. 1, whereby the left-hand leg of the spring 9 bears against the contact 8a and causes the circuit 108 to effect a pivotal movement of the shutter blade 5c in a clockwise direction to thereby terminate the exposure.

The right-hand end portion of the blocking link 6 has a pin 6b which extends into a slot 18a in the bifurcated left-hand end portion of a lever 18 which is pivotable on a pin 18b of the housing section 1 and has a cutout or notch 18d for the pin 15. The right-hand end portion of the link 6 is further formed with a shoulder 6a which faces toward the release 10 and cooperates with the cocking member 4 to prevent the opening of shutter and/or the closing of switch 8a, 8b, 9 when the section 2 is held in the solid-line position of FIG. 4.

The operation is as follows:

In FIG. 1, the cocking of the shutter including the blades 5c, 5d has been completed because the user is assumed to have moved the section 2 from the position 2' to the solid-line position of FIG. 4 and to have thereupon released the section 2 so that the spring 23 was free to return the section 2 to the extended position 2'. As mentioned above, such movement of the section 2 (first in the direction of arrow 14 and thereupon in the direction of arrow 114) is necessary in order to transport the film by the length of a frame, to cock the shutter, to permit the lens 20 to admit scene light to the opening 1a, and to enable the user to observe the scene by looking through the view finder 21, 22.

If the user wishes to make an exposure, the release 10 is pivoted clockwise (arrow A) to stress the spring 12 whereby the linkage 103 pivots the lever 3 against the opposition of the spring 3b and the lever 3 moves away from a shoulder 4e of the cocking member 4. The member 4 is pivoted counterclockwise by the spring 16 so that its lobe 4b moves away from the follower 5b of the carrier 5a. The spring 5 is free to immediately propel the blade 5d to the open position of FIG. 2 in which the opening 1a admits scene light to the film frame behind the lens 20.

The holder 7 is free to pivot under the action of the springy contact 9 simultaneously with (or even prior to) disengagement of the lever 3 from the shoulder 4e so that the contact 9 engages the stationary contact 8a (as mentioned above, the contact 9 permanently engages with the stationary contact 8b) whereby the switch 8a, 8b, 9 is closed and the circuit 108 is energized to effect a movement of the trailing shutter blade 5c behind the opening 1a with a delay which is a function of scene brightness or of another parameter selected by the user to determine the exposure time.

It is clear that the camera which is shown in the drawing may be equipped with a more sophisticated shutter or with a diaphragm shutter which not only determines the exposure time but also the size of the aperture through which scene light passing via opening 1a can reach the film frame behind the lens 20.

When the making of an exposure is completed, the parts of the camera assume the positions which are shown in FIG. 2 except that the trailing blade 5c overlies the opening 1a. In order to make a second exposure, the user must depress the section 2 from the extended position 2' to the solid-line position of FIG. 4. Such movement of the section 2 is shared by its portion 2a which then moves in the direction indicated by arrow 14 and assumes the depressed position shown in FIG. 3. During movement in the direction indicated by arrow 14, the head of the portion 2a engages and pivots the cocking member 4 which is rotated in a clockwise direction (from the position of FIG. 2 to that shown in FIG. 3) whereby the lobe 4b engages the follower 5b and pivots the front blade 5d (and through the medium of this blade also the trailing blade 5c) back to the position of FIG. 1 which corresponds to the position shown in FIG. 3. During such counterclockwise pivoting of the blades 5d, 5c, the shutter overlies the opening 1a so that the latter cannot admit scene light against the film portion behind the lens 20.

Figure 3:
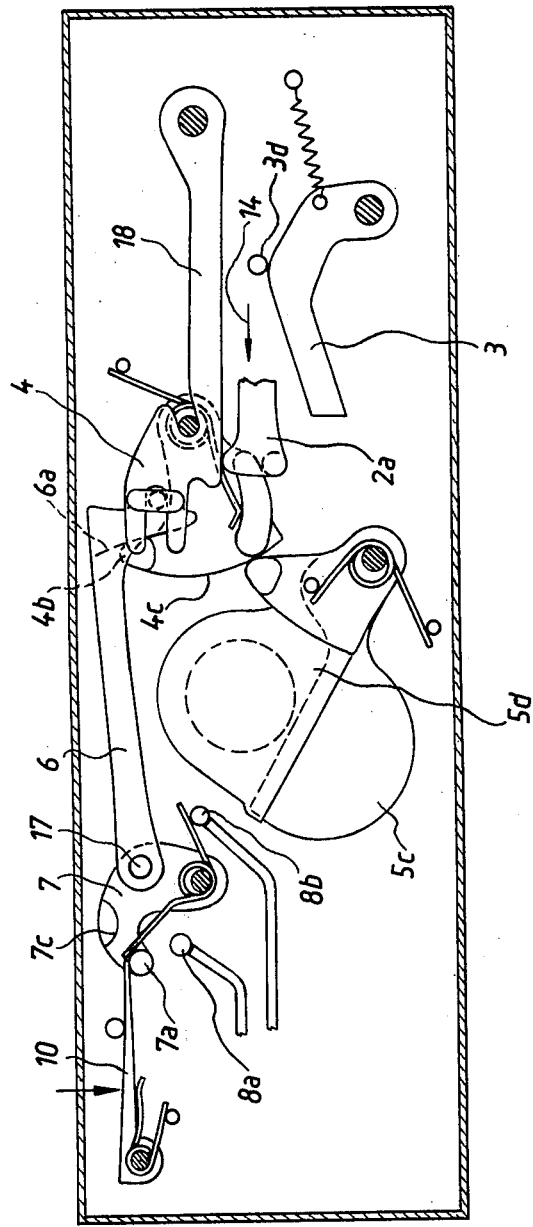
FIG. 3 is a similar view with the shutter again shown in cocked position but with the camera release locked in starting position.

The cocking of the shutter is completed before the portion 2a of the housing section 2 reaches the position of FIG. 3. As soon as the shutter is cocked, the follower 5b is engaged by the cam face 4c of the cocking member 4 which continues to pivot clockwise (i.e., to move beyond an intermediate position in which the cocking of the shutter is completed) and, since the center of curvature of the cam face 4c is located on the axis of the pivot pin 15 for the member 4, the blades 5d, 5c remain in the positions of FIG. 3 while the member 4 moves to the second end position of FIG. 3. Shortly before the member 4 reaches the position of FIG. 3, its lobe 4b engages the shoulder 6a and moves the blocking link 6 in a direction to the right to thereby pivot the holder 7 clockwise and to move the left-hand leg of the contact 9 away from the stationary contact 8a. Thus, the switch including the contacts 8a, 8b, 9 is open. The displacement of the link 6 to the position of FIG. 3 enables the spring 12 to return the release 10 into abutment with the stop 11 whereby the free end of the release 10 abuts against the projection 7c and retains the holder 7 in the angular position of FIG. 1 or 3, even if the lobe 4b moves away from the shoulder 6a, because the spring 12 is stronger than the springy contact 9.

When the user completes the movement of housing section 2 from the extended position 2' to the solid-line position of FIG. 4, the cocking member 4 is held in the position of FIG. 3 because the portion 2a is fully depressed. The spring 3b is free to contact and returns the lever 3 into abutment with a fixed stop 3d. The user thereupon releases the section 2 to the action of the spring 23 which returns the section 2 to the extended position 2' of FIG. 4. Consequently, the portion 2a is retracted to the position of FIG. 1 (by moving in the direction indicated by arrow 114) whereby the spring 16 pivots the cocking member 4 counterclockwise. The shutter remains cocked because the cocking member 4 is intercepted by the lever 3 which abuts against the stop 3d. This completes the manipulation which must precede the making of the second exposure. The second exposure is made by pivoting the release 10 in a clockwise direction.

The lever 18 serves as a simple guide for the blocking link 6 while the latter moves under the action of the lobe 4b or springy contact 9. It will be noted that the release 10 cannot be pivoted away from the stop 11 when the section 2 assumes the solid-line position of FIG. 4 (i.e., when the portion 2a assumes the position shown in FIG. 3) because the link 6 is then positively held by the lobe 4b (which abuts against the shoulder 6a) and the projection 7a holds the release 10 against pivotal movement in the direction indicated by arrow A. When the portion 2a of the housing section 2 moves from the position of FIG. 3 to that shown in FIG. 1, the springy contact 9 is free to pivot the holder 7 counterclockwise through a certain angle; however, such angle is too small to allow the contact 9 to engage the stationary contact 8a so that the switch remains open.

An important advantage of the illustrated camera is that, by the simple expedient of moving the cocking member 4 beyond the (intermediate) position (FIG. 1) in which the shutter is cocked (i.e., to the second end position of FIG. 3), the member 4 can prevent an actuation of the release 10 and/or a closing of the switch 8a, 8b, 9 as long as the section 2 remains in the solid-line position of FIG. 4, either because the section 2 is held by hand or because it is held in such position by the aforementioned locking device. Such mounting of the cocking member 4 contributes to compactness of the section 1.

The improved camera is susceptible of many modifications. For example, the portion 2a can be made longer or configurated in such a way that it can act directly against the switch closing holder 7 when the section 2 is moved to the solid-line position of FIG. 4. Thus, a integral part (2a) of the section 2 (or a part which is directly connected to the section 2) then prevents a closing of the switch (and an actuation of the release) as long as the section 2 remains in the solid-line position of FIG. 4. In such camera, the link 6 (or an analogous direct connection between the holder 7 and the cocking member 4) can be dispensed with. The just described modification is of particular advantage when the shutter is an automatic shutter which need not be mechanically cocked so that the movement of section 2 in the direction indicated by arrow 14 merely serves to transport the film by the length of a frame and preferably to prevent the actuation of camera release as long as the section 2 remains in the solid-line position of FIG. 4.

It is also possible to use the portion 2a of the section 2 as a means for moving one of the contacts 8a, 8b (e.g., the contact 8a) away from the position shown in FIGS. 1 to 3 in response to movement of the section 2 to the solid-line position of FIG. 4 so that the switch cannot be closed if the release 10 is actuated by mistake while the overall size of the camera housing is reduced because the section 2 is held in the solid-line position of FIG. 4, either by hand or by the aforementioned locking device.

The shutter device 5 for instance can work according to U.S. Pat. No. 3,302,544.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a photographic apparatus, a combination comprising a housing having a first section and a second section, said second section being reciprocable with respect to said first section between first and second positions; release means mounted in said first section and having a first member movable between starting and operative positions; a normally open shutter-actuating switch mounted in said first section; means for closing said switch, including a second member movable between starting and operative positions in which said switch is respectively open and closed, said second member being located in the path of movement of said first member at least when said second member assumes said starting position; and means for blocking the movement of at least one of said members while said second section assumes said first position, including a device which is movable by said second position and is arranged to move said one member to its respective starting position to thereby open said switch and to hold said one member against movement to the respective operative position when said second position assumes said first position but to permit the movement of said one member to the respective operative position in response to movement of said second section from said first to said second position so that each closing of said switch in response to movement of said first member from said starting to said operative position thereof must be preceded by a movement of said second section from said second to said first and back to said second position thereof.

2. A combination as defined in claim 1, wherein said switch comprises a first contact, a second contact which is spaced apart from said first contact, and a third contact engaging said first contact and being mounted on said closing means, said third contact engaging said second contact to thereby close said switch in the operative position of said second member.

3. A combination as defined in claim 1, wherein said switch comprises a plurality of contacts which are conductively connected to each other in the closed position of said switch, said device having means for moving one of said contacts to a position in which said switch is open when said second section moves to said first position thereof.

4. A combination as defined in claim 1, wherein said switch comprises means for biasing said second member to said operative position.

5. A combination as defined in claim 1, further comprising a shutter mounted in said first section, said blocking means further comprising a shutter cocking member movable in said first section from a first toward a second position in response to movement of said second section to said first position thereof whereby said shutter cocking member cocks said shutter, said device being arranged to retain said one member in said starting position in the second position of said cocking member.

6. A combination as defined in claim 5, further comprising means for biasing said cocking member to said first position thereof.

7. A combination as defined in claim 5, wherein said shutter is cocked when said cocking member assumes an intermediate position between said first and second positions thereof and said device is engaged by said cocking member while the latter moves beyond said intermediate and to said second position thereof during the last stage of movement of said second section to said first position.

8. A combination as defined in claim 7, wherein said cocking member comprises means for maintaining said shutter in cocked position during movement of said cocking member from said intermediate to said second position thereof.

9. A combination as defined in claim 8, wherein said cocking member is pivotable about a fixed axis and said means for maintaining said shutter in cocked position comprises a cam including an arcuate cam face having a center of curvature on said axis.

10. A combination as defined in claim 1, further comprising a shutter mounted in said first section, said release means being arranged to open said shutter in response to movement of said first member to said operative position and said switch being arranged to effect the closing of said shutter in response to closing of said switch by said closing means.

* * * * *